US010262639B1

(12) United States Patent
Girardot et al.

(10) Patent No.: US 10,262,639 B1
(45) Date of Patent: Apr. 16, 2019

(54) SYSTEMS AND METHODS FOR DETECTING MUSICAL FEATURES IN AUDIO CONTENT

(71) Applicant: GOPRO, INC., San Mateo, CA (US)

(72) Inventors: Agnes Girardot, Paris (FR); Jean-Baptiste Noel, Le Vesinet (FR)

(73) Assignee: GoPro, Inc., San Mateo, CA (US)

( * ) Notice: Subject to any disclaimer, the term of this patent is extended or adjusted under 35 U.S.C. 154(b) by 57 days.

(21) Appl. No.: 15/436,370

(22) Filed: Feb. 17, 2017

Related U.S. Application Data

(60) Provisional application No. 62/419,450, filed on Nov. 8, 2016.

(51) Int. Cl.
*G06F 17/00* (2006.01)
*G10H 1/00* (2006.01)

(52) U.S. Cl.
CPC ..... *G10H 1/0008* (2013.01); *G10H 2210/061* (2013.01); *G10H 2210/066* (2013.01); *G10H 2220/005* (2013.01); *G10H 2250/015* (2013.01)

(58) Field of Classification Search
CPC ........... G10H 1/0008; G10H 2210/066; G10H 2210/071; G10H 2210/076; G10H 2210/086; G10H 2220/005; G10H 2250/015; G10H 2210/061
See application file for complete search history.

(56) References Cited

U.S. PATENT DOCUMENTS

| | | | |
|---|---|---|---|
| 5,130,794 | A | 7/1992 | Ritchey |
| 6,337,683 | B1 | 1/2002 | Gilbert |
| 6,593,956 | B1 | 7/2003 | Potts |

(Continued)

FOREIGN PATENT DOCUMENTS

| | | |
|---|---|---|
| WO | 2001020466 | 3/2001 |
| WO | 2009040538 | 4/2009 |

OTHER PUBLICATIONS

Ricker, "First Click: TomTom's Bandit camera beats GoPro with software" Mar. 9, 2016 URL: http:/www.theverge.com/2016/3/9/11179298/tomtom-bandit-beats-gopro (6 pages).

(Continued)

*Primary Examiner* — Fan S Tsang
*Assistant Examiner* — David Siegel
(74) *Attorney, Agent, or Firm* — Esplin & Associates, PC

(57) ABSTRACT

Systems and methods for identifying musical features in audio content are presented. Audio content information may be obtained from a digital audio file, the information providing a duration for playback of the audio content and a representation of sound frequencies associated with various moments throughout the duration of the audio content. Sound frequencies associated with one or more of the moments throughout the duration of the audio content may be identified, and characteristics or patterns of the identified sound frequencies may be recognized as being indicative of one or more musical features (e.g., parts, phrases, hits, bars, onbeats, beats, quavers, semiquavers, etc.). Some implementations of the present technology define display objects for display on a digital display, the display objects provided with visual features in an arrangement that distinguishes one musical feature from another across the duration of the audio content.

20 Claims, 3 Drawing Sheets

(56) References Cited

U.S. PATENT DOCUMENTS 7,222,356 B1 5/2007 Yonezawa
7,483,618 B1 1/2009 Edwards
8,446,433 B1 5/2013 Mallet
8,611,422 B1 12/2013 Yagnik
8,718,447 B2 5/2014 Yang
8,730,299 B1 5/2014 Kozko
8,763,023 B1 6/2014 Goetz
8,910,046 B2 12/2014 Matsuda
8,988,509 B1 3/2015 Macmillan
9,032,299 B2 5/2015 Lyons
9,036,001 B2 5/2015 Chuang
9,077,956 B1 7/2015 Morgan
9,111,579 B2 8/2015 Meaney
9,142,253 B2 9/2015 Ubillos
9,151,933 B2 10/2015 Sato
9,204,039 B2 12/2015 He
9,208,821 B2 12/2015 Evans
9,245,582 B2 1/2016 Shore
9,253,533 B1 2/2016 Morgan
9,317,172 B2 4/2016 Lyons
9,423,944 B2 8/2016 Eppolito
9,473,758 B1 10/2016 Long
9,479,697 B2 10/2016 Aguilar
9,564,173 B2 2/2017 Swenson
2004/0128317 A1 7/2004 Sull
2005/0025454 A1 2/2005 Nakamura
2005/0241465 A1* 11/2005 Goto ........................ G10D 1/00 84/616
2006/0122842 A1 6/2006 Herberger
2007/0173296 A1 7/2007 Hara
2007/0204310 A1 8/2007 Hua
2007/0230461 A1 10/2007 Singh
2008/0044155 A1 2/2008 Kuspa
2008/0123976 A1 5/2008 Coombs
2008/0152297 A1 6/2008 Ubillos
2008/0163283 A1 7/2008 Tan
2008/0177706 A1 7/2008 Yuen
2008/0208791 A1 8/2008 Das
2008/0253735 A1 10/2008 Kuspa
2008/0313541 A1 12/2008 Shafton
2009/0213270 A1 8/2009 Ismert
2009/0274339 A9 11/2009 Cohen
2009/0327856 A1 12/2009 Mouilleseaux
2010/0045773 A1 2/2010 Ritchey
2010/0064219 A1 3/2010 Gabrisko
2010/0086216 A1 4/2010 Lee
2010/0104261 A1 4/2010 Liu
2010/0183280 A1 7/2010 Beauregard
2010/0231730 A1 9/2010 Ichikawa
2010/0245626 A1 9/2010 Woycechowsky
2010/0251295 A1 9/2010 Amento
2010/0278504 A1 11/2010 Lyons
2010/0278509 A1 11/2010 Nagano
2010/0281375 A1 11/2010 Pendergast
2010/0281386 A1 11/2010 Lyons
2010/0287476 A1 11/2010 Sakai
2010/0299630 A1 11/2010 McCutchen
2010/0318660 A1 12/2010 Balsubramanian
2010/0321471 A1 12/2010 Casolara
2011/0025847 A1 2/2011 Park
2011/0069148 A1 3/2011 Jones
2011/0069189 A1 3/2011 Venkataraman
2011/0075990 A1 3/2011 Eyer
2011/0093798 A1 4/2011 Shahraray
2011/0134240 A1 6/2011 Anderson
2011/0173565 A1 7/2011 Ofek
2011/0206351 A1 8/2011 Givoly
2011/0211040 A1 9/2011 Lindemann
2011/0258049 A1 10/2011 Ramer
2011/0293250 A1 12/2011 Deever
2011/0320322 A1 12/2011 Roslak
2012/0014673 A1 1/2012 O'Dwyer
2012/0027381 A1 2/2012 Kataoka
2012/0030029 A1 2/2012 Flinn
2012/0057852 A1 3/2012 Devleeschouwer
2012/0123780 A1 5/2012 Gao
2012/0127169 A1 5/2012 Barcay
2012/0206565 A1 8/2012 Villmer
2012/0311448 A1 12/2012 Achour
2013/0024805 A1 1/2013 In
2013/0044108 A1 2/2013 Tanaka
2013/0058532 A1 3/2013 White
2013/0063561 A1 3/2013 Stephan
2013/0078990 A1 3/2013 Kim
2013/0127636 A1 5/2013 Aryanpur
2013/0136193 A1 5/2013 Hwang
2013/0142384 A1 6/2013 Ofek
2013/0151970 A1 6/2013 Achour
2013/0166303 A1 6/2013 Chang
2013/0191743 A1 7/2013 Reid
2013/0195429 A1 8/2013 Fay
2013/0197967 A1 8/2013 Pinto
2013/0208134 A1 8/2013 Hamalainen
2013/0208942 A1 8/2013 Davis
2013/0215220 A1 8/2013 Wang
2013/0259399 A1 10/2013 Ho
2013/0263002 A1 10/2013 Park
2013/0283301 A1 10/2013 Avedissian
2013/0287214 A1 10/2013 Resch
2013/0287304 A1 10/2013 Kimura
2013/0300939 A1 11/2013 Chou
2013/0308921 A1 11/2013 Budzinski
2013/0318443 A1 11/2013 Bachman
2013/0343727 A1 12/2013 Rav-Acha
2014/0026156 A1 1/2014 Deephanphongs
2014/0064706 A1 3/2014 Lewis, II
2014/0072285 A1 3/2014 Shynar
2014/0093164 A1 4/2014 Noorkami
2014/0096002 A1 4/2014 Dey
2014/0105573 A1 4/2014 Hanckmann
2014/0161351 A1 6/2014 Yagnik
2014/0165119 A1 6/2014 Liu
2014/0169766 A1 6/2014 Yu
2014/0176542 A1 6/2014 Shohara
2014/0193040 A1 7/2014 Bronshtein
2014/0212107 A1 7/2014 Saint-Jean
2014/0219634 A1 8/2014 McIntosh
2014/0226953 A1 8/2014 Hou
2014/0232818 A1 8/2014 Carr
2014/0232819 A1 8/2014 Armstrong
2014/0245336 A1 8/2014 Lewis, II
2014/0300644 A1 10/2014 Gillard
2014/0328570 A1 11/2014 Cheng
2014/0341528 A1 11/2014 Mahate
2014/0366052 A1 12/2014 Ives
2014/0376876 A1 12/2014 Bentley
2015/0015680 A1 1/2015 Wang
2015/0022355 A1 1/2015 Pham
2015/0029089 A1 1/2015 Kim
2015/0058709 A1 2/2015 Zaletel
2015/0085111 A1 3/2015 Lavery
2015/0154452 A1 6/2015 Bentley
2015/0178915 A1 6/2015 Chatterjee
2015/0186073 A1 7/2015 Pacurariu
2015/0220504 A1 8/2015 Bocanegra Alvarez
2015/0254871 A1 9/2015 Macmillan
2015/0256746 A1 9/2015 Macmillan
2015/0256808 A1 9/2015 Macmillan
2015/0271483 A1 9/2015 Sun
2015/0287435 A1 10/2015 Land
2015/0294141 A1 10/2015 Molyneux
2015/0318020 A1 11/2015 Pribula
2015/0339324 A1 11/2015 Westmoreland
2015/0375117 A1 12/2015 Thompson
2015/0382083 A1 12/2015 Chen
2016/0005435 A1 1/2016 Campbell
2016/0005440 A1 1/2016 Gower
2016/0026874 A1 1/2016 Hodulik
2016/0027470 A1 1/2016 Newman
2016/0027475 A1 1/2016 Hodulik
2016/0029105 A1 1/2016 Newman
2016/0055885 A1 2/2016 Hodulik
2016/0088287 A1 3/2016 Sadi
2016/0098941 A1 4/2016 Kerluke

(56) References Cited

U.S. PATENT DOCUMENTS

| | | | |
|---|---|---|---|
| 2016/0119551 | A1 | 4/2016 | Brown |
| 2016/0217325 | A1 | 7/2016 | Bose |
| 2016/0225405 | A1 | 8/2016 | Matias |
| 2016/0225410 | A1 | 8/2016 | Lee |
| 2016/0234345 | A1 | 8/2016 | Roberts |
| 2016/0358603 | A1 | 12/2016 | Azam |
| 2016/0366330 | A1 | 12/2016 | Boliek |
| 2017/0006214 | A1 | 1/2017 | Andreassen |
| 2017/0097992 | A1 * | 4/2017 | Vouin ................ G06F 17/30743 |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding_html>.

FFmpeg, "Muxing," Doxygen, Jul. 20, 2014, 9 Pages [online] [retrieved on Jul. 13, 2015] Retrieved from the internet <URL: https://www.ffmpeg.org/doxyg en/2. 3/structA Vp a ck et. html>.

Han et al., Deep Compression: Compressing Deep Neural Networks with Pruning, Trained Quantization and Huffman Coding, International Conference on Learning Representations 2016, 14 pgs.

He et al., "Deep Residual Learning for Image Recognition," arXiv:1512.03385, 2015, 12 pgs.

Iandola et al., "SqueezeNet: AlexNet—level accuracy with 50x fewer parameters and <0.5MB model size," arXiv:1602.07360, 2016, 9 pgs.

Iandola et al., "SqueezeNet: AlexNet—level accuracy with 50x fewer parameters and <0.5MB model size", arXiv:1602.07360v3 [cs.CV] Apr. 6, 2016 (9 pgs.).

Ioffe et al., "Batch Normalization: Accelerating Deep Network Training by Reducing Internal Covariate Shift," arXiv:1502.03167, 2015, 11 pgs.

Parkhi et al., "Deep Face Recognition," Proceedings of the British Machine Vision, 2015, 12 pgs.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 20 pages.

PCT International Search Report and Written Opinion for PCT/US2015/023680, dated Oct. 6, 2015, 13 pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 pages.

Schroff et al., "FaceNet: A Unified Embedding for Face Recognition and Clustering," IEEE Conference on Computer Vision and Pattern Recognition (CVPR), 2016, 10 pgs.

Tran et al., "Learning Spatiotemporal Features with 3D Convolutional Networks", arXiv:1412.0767 [cs.CV] Dec. 2, 2014 (9 pgs).

Yang et al., "Unsupervised Extraction of Video Highlights Via Robust Recurrent Auto-encoders" arXiv:1510.01442v1 [cs.CV] Oct. 6, 2015 (9 pgs).

Ernoult, Emeric, "How to Triple Your YouTube Video Views with Facebook", SocialMediaExaminer.com, Nov. 26, 2012, 16 pages.

PCT International Search Report and Written Opinion for PCT/US15/18538, dated Jun. 16, 2015, 26 pages.

PCT International Search Report for PCT/US17/16367 dated Apr. 14, 2017 (2 pages).

PCT International Search Reort for PCT/US15/18538 dated Jun. 16, 2015 (2 pages).

* cited by examiner

SYSTEMS AND METHODS FOR DETECTING MUSICAL FEATURES IN AUDIO CONTENT

FIELD

The present disclosure relates to systems and methods for detecting musical features in audio content.

BACKGROUND

Many computing platforms exist to enable consumption of digitized audio content, often by providing an audible playback of the digitized audio content. Some users may wish to understand, comprehend, and/or perceive audio content at a deeper level than may be possible by merely listening to the playback of the digitized audio content. Conventional systems and methods do not provide the foregoing capabilities, and are inadequate for enabling a user to effectively, efficiently, and comprehensibly identify when, where, and/or how frequently particular musical features occur in certain audio content (or in playback of the digitized audio content).

SUMMARY

The disclosure herein relates to systems and methods for identifying musical features in audio content are presented. In particular, a user may wish to pinpoint when, where, and/or how frequently particular musical features occur in certain audio content (or in playback of the digitized audio content). For example, for a given MP3 music file (exemplary digitized audio content), a user may wish to identify parts, phrases, bars, hits, hooks, onbeats, beats, quavers, semiquavers, or any other musical features occurring within or otherwise associated with the digitized audio content. As used herein, the term "musical features" may include, without limitation, elements common to musical notations, elements common to transcriptions of music, elements relevant to the process of synchronizing a musical performance among multiple contributors, and/or other elements related to audio content. In some implementations, a part may include multiple phrases and/or bars. For example, a part in a commercial pop song may be an intro, a verse, a chorus, a bridge, a hook, a drop, and/or another major portion of the song. In some implementations, a phrase may include multiple beats. In some implementations, a phrase may span across multiple beats. In some implementations, a phrase may span across multiple beats without the beginning and ending of the phrase coinciding with beats. Musical features may be associated with a duration or length, e.g. measured in seconds.

In some implementations, users may wish to perceive a visual representation of these musical features, simultaneously or non-simultaneously with real-time or near real time playback. Users may further wish to utilize digitized audio content in certain ways for certain applications based on musical features occurring within or otherwise associated with the digitized audio content.

In some implementations of the technology disclosed herein, a system for identifying musical features in digital audio content includes one or more physical computer processors configured by computer readable instructions to: obtain a digital audio file, the digital audio file including information representing audio content, the information providing a duration for playback of the audio content and a representation of sound frequencies associated with one or more moments in the audio content; identify a beat of the audio content represented by the information; identify one or more sound frequencies associated with a first moment in the audio content; identify one or more sound frequencies associated with a second moment in audio content playback; identify one or more frequency characteristics associated with the first moment based on one or more of the sound frequencies associated with the first moment and/or the sound frequencies associated with the second moment; identify one or more musical features associated with the first moment based on one or more of the identified frequency characteristics associated with the first moment, wherein the one or more musical features include one or more of a part, a phrase, a bar, a hit, a hook, an onbeat, a beat, a quaver, a semiquaver, and/or other musical features.

In some implementations, the frequency characteristics utilized to identify a part in the audio content is/are detected based on a Hidden Markov Model. In some implementations, the identification of one or more musical features is based on the identification of a part using the Hidden Markov Model. In some implementations, the one or more physical computer processors may be configured to define object definitions for one or more display objects, wherein the display objects represent one or more of the identified musical features. In some implementations, the object definitions include: a visible feature of the display objects to reflect the type of musical feature associated therewith. In some implementations, the visible feature includes one or more of size, shape, color, and/or position.

In some implementations, of the present technology, a system a method for identifying musical features in digital audio content may include the steps of (in no particular order): (i) obtaining a digital audio file, the digital audio file including information representing audio content, the information providing a duration for playback of the audio content and a representation of sound frequencies associated with one or more moments in the audio content, (ii) identify a beat of the audio content represented by the information; (iii) identifying one or more sound frequencies associated with a first moment in the audio content, (iv) identifying one or more sound frequencies associated with a second moment in audio content playback, (v) identifying one or more frequency characteristics associated with the first moment based on one or more of the sound frequencies associated with the first moment and/or the sound frequencies associated with the second moment, (vi) identifying one or more musical features associated with the first moment based on one or more of the identified frequency characteristics associated with the first moment and/or the identified beat, wherein the one or more musical features include one or more of a part, a phrase, a hit, a bar, an onbeat, a quaver, a semiquaver, and/or other musical features.

In some implementations, the method may include providing one or more of the display objects for display on a display during audio content playback such that the relative location of display objects displayed on the display provides visual indicia of the relative moment in the duration of the audio content where the musical features the display objects are associated with occur. In some implementations, the visual indicia includes a horizontal separation between display objects, the display objects representing musical features, and the horizontal separation corresponding to the amount of playback time elapsing between the musical features during audio content playback. In some implementations, the visual indicia includes a horizontal separation between a display object and a playback moment indicator indicating the moment in the audio content that is presently being played back, and the horizontal separation corresponding to the amount of playback time between the moment presently being played back and the musical feature associated with the display object. In some implementations, the identification of the one or more musical features is based on a match between one or more of the identified frequency characteristics and a predetermined frequency pattern template corresponding to a particular musical feature.

In some system implementations in accordance with the present technology, a system for identifying musical features in digital audio content is provided, the system including one or more physical computer processors configured by computer readable instructions to: obtain a digital audio file, the digital audio file including information representing audio content, the information providing a duration for playback of the audio content and a representation of sound frequencies associated with one or more moments throughout the duration of the audio content; identify a beat of the audio content represented by the information; identify one or more sound frequencies associated with one or more of the moments throughout the duration of the audio content; identify one or more frequency characteristics associated with a distinct moment in the audio content based on one or more of the sound frequencies associated with the distinct moment, and/or the sound frequencies associated with one or more other moments in the audio content; identify one or more musical features associated with the distinct moment based on one or more of the identified frequency characteristics associated with the distinct moment and/or the identified beat, wherein the one or more musical features include one or more of a part, a phrase, a hit, a bar, an onbeat, a quaver, a semiquaver, and/or other musical features.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
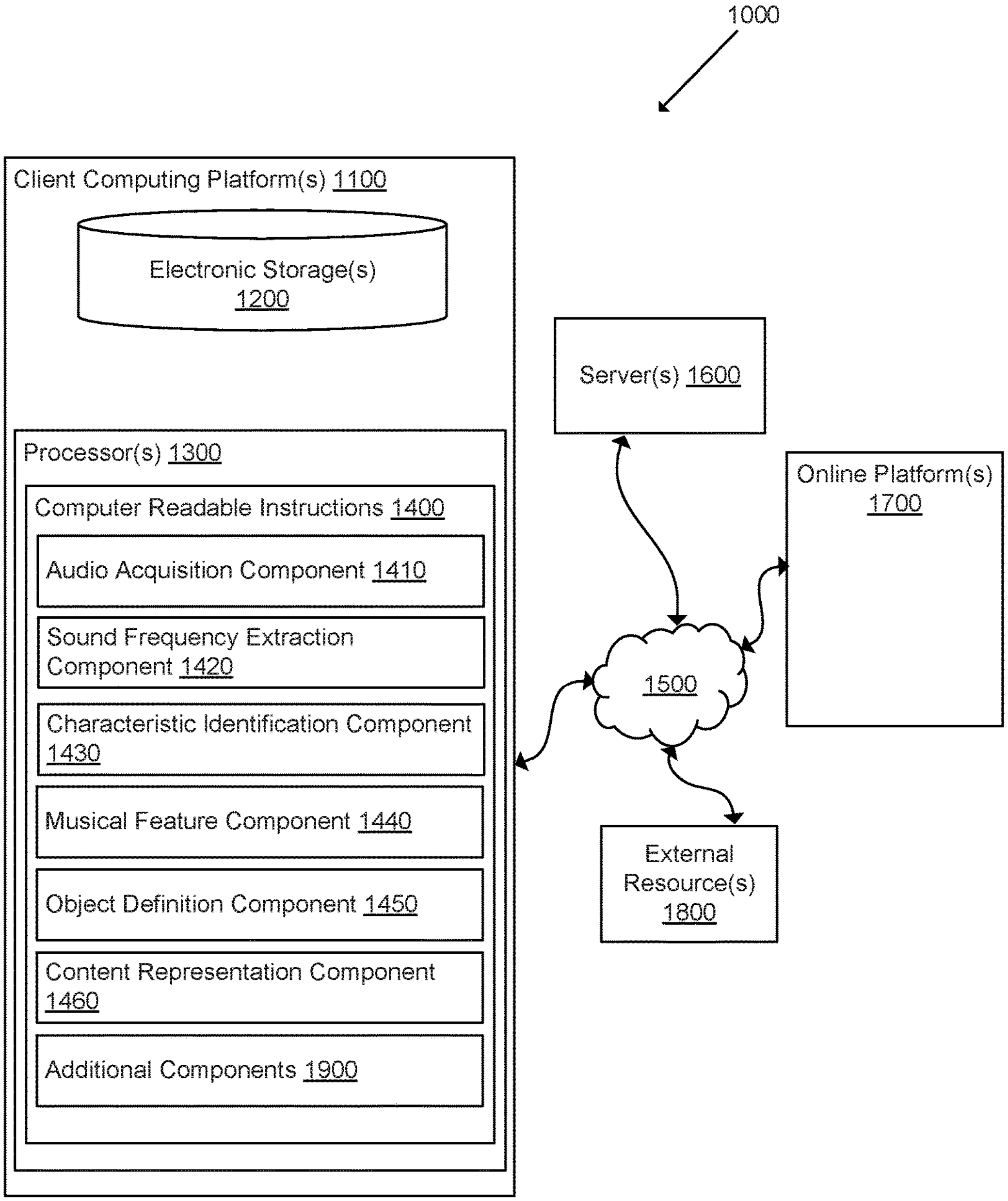
FIG. 1 illustrates an exemplary system for detecting musical features associated with audio content in accordance with one or more implementations of the present disclosure.

FIG. 1 illustrates an exemplary system for detecting musical features in audio content in accordance with one or more implementations of the present disclosure. As shown, system 1000 may include one or more client computing platform(s) 1100, electronic storage(s) 1200, server(s) 1600, online platform(s) 1700, external resource(s) 1800, physical processor(s) 1300 configured to execute machine-readable instructions 1400, computer program components 1410-1470, and/or other additional components 1900. System 1000, in connection with any one or more of the elements depicted in FIG. 1, may obtain audio content information; identify one or more sound frequency measure(s) in the audio content information; recognize one or more characteristic(s) of the audio content information based on one or more of the frequency measure(s) identified (e.g., recognizing frequency patterns associated with the audio content represented by audio content information, recognizing the presence or absence of certain frequencies in one or more samples as compared with one or more other samples coded in the audio content information); identify one or more musical features represented in the audio content information based on: (i) one or more of the frequency measure(s) identified, (ii) one or more of the characteristic(s) identified, and/or (iii) an extrapolation from one or more previously identified musical features; and/or define object definition(s) of one or more display objects that represent one or more of the one or more musical features identified. These and other features may be implemented in accordance with the disclosed technology.

Client computing platform(s) 1100 may include one or more of a cellular telephone, a smartphone, a digital camera, a laptop, a tablet computer, a desktop computer, a television set-top box, smart TV, a gaming console, and/or other computing platforms. Client computing platform(s) 1100 may embody or otherwise be operatively linked to electronic storage 1200 (e.g., solid-state storage, hard disk drive storage, cloud storage, and/or ROM, etc.), server(s) 1600 (e.g., web servers, collaboration servers, mail servers, application servers, and/or other server platforms, etc.), online platform(s) 1700, and/or external resources 1800. Online platform(s) 1700 may include one or more of a multimedia platform (e.g., Netflix), a media platform (e.g., Pandora), and/or other online platforms (e.g., YouTube). External resource(s) 1800 may include one or more of a broadcasting network, a station, and/or any other external resource that may be operatively coupled with one or more client computing platform(s) 1100, online platform(s) 1700, and/or server(s) 1800. In some implementations, external resource(s) 1800 may include other client computing platform(s) (e.g., other desktop computers in a distributed computing network), or peripherals such as speakers, microphones, or other transducers or sensors.

Any one or more of client computing platform(s) 1100, electronic storage(s) 1200, server(s) 1600, online platform(s) 1700, and/or external resource(s) 1800 may—alone or operatively coupled in combination—include, create, store, generate, identify, access, open, obtain, encode, decode, consume, or otherwise interact with one or more digital audio files (e.g., container file, wrapper file, or other metafile). Any one or more of the foregoing—alone or operatively coupled in combination—may include, in hardware or software, one or more audio codecs configured to compress and/or decompress digital audio content information (e.g., digital audio data), and/or encode analog audio as digital signals and/or convert digital signals back into audio. in accordance with any one or more audio coding formats.

Digital audio files (e.g., containers) may include digital audio content information (e.g., raw data) that represents audio content. For instance, digital audio content information may include raw data that digitally represents analog signals (or, digitally produced signals, or both) sampled regularly at uniform intervals, each sample being quantized (e.g., based on amplitude of the analog, a preset/predetermined framework of quantization levels, etc.). In some implementations, digital audio content information may include machine readable code that represents sound frequencies associated with one or more sample(s) of the original audio content (e.g., a sample of an original analog or digital audio presentation). Digital audio files (e.g., containers) may include audio content information (e.g., raw data) in any digital audio format, including any compressed or uncompressed, and/or any lossy or lossless digital audio formats known in the art (e.g., MPEG-1 and/or MPEG-2 Audio Layer III (.mp3), Advanced Audio Coding format (.aac), Windows Media Audio format (.wma), etc.)), and/or any other digital formats that have or may in the future be adopted. Further, Digital audio files may be in any format, including any container, wrapper, or metafile format known in the art (e.g., Audio Interchange File Format (AIFF), Waveform Audio File Format (WAV), Extensible Music Format (XMF), Advanced Systems Format (ASF), etc.). Digital audio files may contain raw digital audio data in more than one format, in some implementations.

A person having skill in the art will appreciate that digital audio content information may represent audio content of any composition; such as, for example: vocals, brass/string/woodwind/percussion/keyboard related instrumentals, electronically generated sounds (or representations of sounds), or any other sound producing means or audio content information producing means (e.g., a computer), and/or any combination of the foregoing. For example, the audio content information may include a machine-readable code representing one or more signals associated with the frequency of the air vibrations produced by a band at a live concert or in the studio (e.g., as transduced via a microphone or other acoustic-to electric transducer or sensor). A machine-readable code representation of audio content may include temporal information associated with the audio content. For example, a digital audio file may include or contain code representing sound frequencies for a series of discrete samples (taken at a certain sampling frequency during recording, e.g., 44.1 kHz sampling rate). The machine readable code associated with each sample may be arranged or created in a manner that reflects the relative timing and/or logical relationship among the other samples in the same container (i.e. the same digital audio file).

For example, there may be 1,323,000 discretized samples taken to represent a thirty-second song recorded at a 44.1 kHz sampling frequency. In such an instance, the information associated with each sample is provided in machine readable code such that, when played back or otherwise consumed, the information for a given sample retains its relative temporal, spatial, and/or logical sequential arrangement relative to the other samples. The information associated with each sample may be encoded in any audio format (e.g., .mp3, .aac, .wma, etc.), and provided in any container/wrapper format (e.g., AIFF, WAV, XMF, ASF, etc.) or other metafile format. Referring to the thirty-second song example above, for instance, the first sample encoded in a digital file may relate to the first sound frequency of the audio content (e.g., Time=00:00 of the song), the last sample may relate to the last sound frequency of the audio content (e.g., at Time=00:30 of the song), and one or more of the remaining 1322,998 samples may be logically arranged, interleaved, and/or dispersed therebetween based on their temporal, spatial, or logical sequential relationship with other samples. The machine-readable code representation may be interpreted and/or processed by one or more computer processor(s) 1300 of client computing platform 1100. Client computing platform 1100 may be configured with any one or more components or programs configured to identify open a container file (i.e. a digital audio file), and to decode the contained data (i.e. the digital audio content information). In some implementations, the digital audio file and/or the digital audio content information are configured such that they may be processed for playback through any one or more speakers (speaker hardware being an example of an external resource 1800) based in part on the temporal, spatial, or logical sequential relationship established in the machine-readable code representation.

Digital audio files and/or digital audio content information may be accessible to client computing platform(s) 1100 (e.g., laptop computer, television, PDA, etc.) through any one or more server(s) 1600, online platform(s) 1700, and/or external resource(s) 1800 operatively coupled thereto, by, for example, broadcast (e.g., satellite broadcasting, network broadcasting, live broadcasting, etc.), stream (e.g., online streaming, network streaming, live streaming, etc.), download (e.g., internet facilitated download, download from a disk drive, flash drive, or other storage medium), and/or any other manner. For instance, a user may stream the audio from a live concert via an online platform on a tablet computer, or play a song from a CD-ROM being read from a CD drive in their laptop, or copy an audio content file stored on a flash drive that is plugged into their desktop computer.

As noted, system 1000, in connection with any one or more of the elements depicted in FIG. 1, may obtain audio content information representing audio content (e.g., via receiving and/or opening an audio file); identify one or more sound frequency measure(s) associated with the represented audio content, based on the obtained audio content information; recognize one or more characteristic(s) associated with the represented audio content, based on one or more of the frequency measure(s) identified (e.g., recognizing frequency patterns associated with the audio content represented by audio content information, recognizing the presence or absence of certain frequencies in one or more samples as compared with one or more other samples coded in the audio content information); identify one or more musical features associated with the represented audio content, based on: (i) one or more of the frequency measure(s) identified, (ii) one or more of the characteristic(s) identified, and/or (iii) an extrapolation from one or more previously identified musical features; and/or define object definition(s) of one or more display objects that represent one or more of the one or more musical features identified. These and other features may be implemented in accordance with the disclosed technology.

As depicted in FIG. 1, physical processor(s) 1300 may be configured to execute machine-readable instructions 1400. As one of ordinary skill in the art will appreciate, such machine readable instructions may be stored in a memory (not shown) and made accessible to the physical processor(s) 1300 for execution. Executing machine-readable instructions 1400 may cause the one or more physical processor(s) 1300 to effectuate access to and analysis of audio content information and/or to effectuate presentation of display objects representing musical features identified via the audio content information associated with the audio content represented thereby. Machine-readable instructions 1400 of system 1000 may include one or more computer program components such as audio acquisition component 1410, sound frequency extraction component 1420, characteristic identification component 1430, musical feature component 1440, object definition component 1450, content representation component 1460, and/or one or more additional components 1900.

Audio acquisition component 1410 may be configured to obtain and/or open digital audio files (which may include digital audio streams) to access digital audio content information contained therein, the digital audio content information representing audio content. Audio acquisition component 1410 may include a software audio codec configured to decode the audio digital audio content information obtained from a digital audio container (i.e. a digital audio file). Audio acquisition component 1410 may acquire the digital audio information in any manner (including from another source), or it may generate the digital audio information based on analog audio (e.g., via a hardware codec) such as sounds/air vibrations perceived via a hardware component operatively coupled therewith (e.g., microphone).

In some implementations, audio acquisition component 1410 may be configured to copy or download digital audio files from one or more of server(s) 1600, online platform(s) 1700, external resource(s) 1800 and/or electronic storage 1200. For instance, a user may engage audio acquisition component (directly or indirectly) to select, purchase and/or download a song (contained in a digital audio file) from an online platform such as the iTunes store or Amazon Prime Music. Audio acquisition component 1410 may store/save the downloaded audio for later use (e.g., in/on electronic storage 1200). Audio acquisition component 1410 may be configured to obtain the audio content information contained within the digital audio file by, for example, opening the file container and decoding the encoded audio content information contained therein.

In some implementations, audio acquisition component 1410 may obtain digital audio information by directly generating raw data (e.g., machine readable code) representing electrical signals provided or created by a transducer (e.g., signals produced via an acoustic-to-electrical transduction device such as a microphone or other sensor based on perceived air vibrations in a nearby environment (or in an environment with which the device is perceptively coupled)). That is, audio acquisition component 1410 may, in some implementations, obtain the audio content information by creating itself rather than obtaining it from a pre-coded audio file from elsewhere. In particular, audio acquisition component 1410 may be configured to generate a machine-readable representation (e.g., binary) of electrical signals representing analog audio content. In some such implementations, audio acquisition component 1410 is operatively coupled to an acoustic-to-electrical transduction device such as a microphone or other sensor to effectuate such features. In some implementations, audio acquisition component 1410 may generate the raw data in real time or near real time as electrical signals representing the perceived audio content are received.

Sound frequency recovery component 1420 may be configured to determine, detect, measure, and/or otherwise identify one or more frequency measures encoded within or otherwise associated with one or more samples of the digital audio content information. As used herein, the term "frequency measure" may be used interchangeably with the term "frequency measurement". Sound frequency recovery component 1420 may identify a frequency spectrum for any one or more samples by performing a discrete-time Fourier transform, or other transform or algorithm to convert the sample data into a frequency domain representation of one or more portions of the digital audio content information. In some implementations, a sample may only include one frequency (e.g., a single distinct tone), no frequency (e.g., silence), and/or multiple frequencies (e.g., a multi-instrumental harmonized musical presentation). In some implementations, sound frequency recovery component 1420 may include a frequency lookup operation where a lookup table is utilized to determine which frequency or frequencies are represented by a given portion of the decoded digital audio content information. There may be one or more frequencies identified/recovered for a given portion of digital audio content information. Sound frequency recovery component 1420 may recover or identify any and/or all of the frequencies associated with audio content information in a digital audio file. In some implementations, frequency measures may include values representative of the intensity, amplitude, and/or energy encoded within or otherwise associated with one or more samples of the digital audio content information. In some implementations, frequency measures may include values representative of the intensity, amplitude, and/or energy of particular frequency ranges.

Characteristic identification component 1430 may be configured to identify one or more characteristics about a given sample based on: frequency measure(s) identified for that particular sample, frequency measure(s) identified for any other one or more samples in comparison to frequency measure(s) identified with the given sample, recognized patterns in frequency measure(s) across multiple samples, and/or frequency attributes that match or substantially match (i.e., within a predefined threshold) with one or more preset frequency characteristic templates provided with the system and/or defined by a user. A frequency characteristic template may include a frequency profile that describes a pattern that has been predetermined to be indicative of a significant or otherwise relevant attribute in audio content. Characteristic identification component 1430 may employ any set of operations and/or algorithms to identify the one or more characteristics about a given sample, a subset of samples, and/or all samples in the audio content information.

In some implementations, characteristic identification component 1430 may be configured to determine a pace and/or tempo for some or all of the digital audio content information. For example, a particular portion of a song may be associated with a particular tempo. Such as tempo may be described by a number of beats per minute, or BPM.

For example, characteristic identification component 1430 may be configured to determine whether the intensity, amplitude, and/or energy in one or more particular frequency ranges is decreasing, constant, or increasing across a particular period. For example, a drop may be characterized by an increasing intensity spanning multiple bars followed by a sudden and brief decrease in intensity (e.g., a brief silence). For example, the particular period may be a number of samples, an amount of time, a number of beats, a number of bars, and/or another unit of measurement that corresponds to duration. In some implementations, the frequency ranges may include bass, middle, and treble ranges. In some implementations, the frequency ranges may include about 5, 10, 15, 20, 25, 30, 40, 50 or more frequency ranges between 20 Hz and 20 kHz (or in the audible range). In some implementations, one or more frequency ranges may be associated with particular types of instrumentation. For example, frequency ranges at or below about 300 Hz (this may be referred to as the lower range) may be associated with percussion and/or bass. In some implementations, one or more beats having a substantially lower amplitude in the lower range (in particular in the middle of a song) may be identified as a percussive gap. The example of 300 Hz is not intended to be limiting in any way. As used herein, substantially lower may be implemented as 10%, 20%, 30%, 40%, 50%, and/or another percentage lower than either immediately preceding beats, or the average of all or most of the song. A substantially lower amplitude in other frequency ranges may be identified as a particular type of gap. For example, analysis of a song may reveal gaps for certain types of instruments, for singing, and/or other components of music.

Musical feature component 1440 may be configured to identify a musical feature that corresponds to a frequency characteristic identified by characteristic identification component 1430. Musical feature component 1440 may utilize a frequency characteristic database that defines, describes or provides one or more predefined musical features that correspond to a particular frequency characteristic. The database may include a lookup table, a rule, an instruction, an algorithm, or any other means of determining a musical feature that corresponds to an identified frequency characteristic. For example, a state change identified using a Hidden Markov Model may correspond to a "part" within the audio content information. In some implementations, musical feature component 1440 may be configured to receive input from a user who may listen to and manually (e.g., using a peripheral input device such as a mouse or a keyboard) identify that a particular portion of the audio content being played back corresponds to a particular musical feature (e.g., a beat) of the audio content. In some implementations, musical feature component 1440 may identify a musical feature of audio content based, in whole or in part, on one or more other musical features identified in connection with the audio content. For example, musical feature component 1440 may detect beats and parts associated with the audio content encoded in a given audio file, and musical feature component 1440 may utilize one or both of these musical features (and/or the frequency measure and/or characteristic information that lead to their identification) to identify other musical features such as bars, onbeats, quavers, semi-quavers, etc. For example, in some implementations the system may identify bars, onbeats, quavers, and semi-quavers by extrapolating such information from the beats and/or parts identified. In some implementations, the beat timing and the associated time measure of the song provide adequate information for music feature component 1440 to determine an estimate of where the bars, onbeats, quavers, and/or semiquavers must occur (or are most likely to occur, or are expected to occur).

In some implementations, one or more components of system 1000, including but not limited to characteristic identification component 1430 and musical feature component 1440, may employ a Hidden Markov Model (HMM) to detect state changes in frequency measures that reflect one or more attributes about the represented audio content. In some implementations, system 1000 may employ another statistical Markov model and/or a model based on one or more statistical Markov models to detect state changes in frequency measures that reflect one or more attributes about the represented audio content. An HMM may be designed to find, detect, and/or otherwise determine a sequence of hidden states from a sequence of observed states. In some implementations, a sequence of observed states may be a sequence of two or more (sound) frequency measures in a set of (subsequent and/or ordered) musical features, e.g. beats. In some implementations, a sequence of observed states may be a sequence of two or more (sound) frequency measures in a set of (subsequent and/or ordered) samples of the digital audio content information. In some implementations, a sequence of hidden states may be a sequence of two or more (musical) parts, phrases, and/or other musical features. For example, the HMM may be designed to detect and/or otherwise determine whether two or more subsequent beats include a transition from a first part (of a song) to a second part (of the song). By way of non-limiting example, in many cases, songs may include four or less distinct parts (or types of parts), such that an HMM having four hidden states is sufficient to cover transitions between parts of the song.

Transition matrix A of the HMM reflects the probabilities of a transition between hidden states (or, for example, between distinct parts). In some implementations, transition matrix A may have a strong diagonal values (i.e., high values along the diagonal of the matrix, e.g. of 0.99 or more) and weak values (i.e., low probabilities) outside the diagonal, in particular at initialization. In some implementations, the probabilities of the initial states may be uniform, e.g. at 1/N (for N hidden states). As the song is analyzed via the HMM, transition matrix A may be adjusted and/or updated. This process may be referred to as learning. For example, in some implementations, learning by the HMM may be implemented via a Baum-Welch algorithm (or an algorithm derived from and/or based on the Baum-Welch algorithm). In some implementations, changes to transition matrix A may be dissuaded, for example through a preference of adjusting the initial states probabilities and/or the emission probability.

The emission probability reflects the probability of being in a particular hidden state responsive to the occurrence of a particular observed state. In some implementations, the HMM may use and/or assume Gaussian emission, meaning that the emission probability has a Gaussian form with a particular mu (p) and a particular sigma (a). As a song is analyzed via the HMM, mu and sigma may be adjusted and/or updated. In some implementations, sigma may be initialized corresponding to the diagonal of the covariance matrix of the observations. In some implementations, mu may be initialized corresponding to the centers of a k-means clustering of the observations for k=N (for N hidden states).

A particular sequence of observed states may have a particular probability of occurring according to the HMM. Note that the particular sequence of observed states may have been produced by different sequences of hidden states, such that each of the different sequences has a particular probability. In some implementations, finding a likely (or even the most likely) sequence from a set of different sequences may be implemented using the Viterbi algorithm (or an algorithm derived from and/or based on the Viterbi algorithm).

In some implementations, an identified sequence of parts in a song (i.e., the identified transitions between different types of parts in the song) may be adjusted such that the transitions occur at a bar. By way of non-limiting example, in many cases, songs may have changes of parts at a bar. The identified sequence may be adjusted by shifting one or more part changes by a few beats. For example, a particular 2-minute song may have three identified transitions, say, from part X to part Y, then to part Z, and then to part X. These three transitions may occur at $t_1$=0:30, $t_2$=1:03, and $t_3$=1:40. In this example, t2 (here, the transition from part Y to part Z) happens to fall between two identified bars, $bar_{(i)}$ at t=1:01 and $bar_{(i+1)}$ at t=1:05. The sequence of transitions may be adjusted by either moving the second transition to t=1:01 or to t=1:05. Each option for an adjustment may correspond to a probability that can be calculated using the HMM. In some implementations, system 1000 may be configured to select the adjustment with the highest probability (among the possible adjustments) according to the HMM. Adjustments of transitions are not limited to bars, but may coincide with other musical features as well. For example, a particular transition may happen to fall between two identified beats. In some implementations, system 1000 may be configured to select the adjustment to the nearest beat with the highest probability (among both possible adjustments) according to the HMM.

In some implementations, system 1000 may be configured to order different types of musical features hierarchically. For example, a part may have the highest priority and a semiquaver may have the lowest priority. A higher priority may correspond to a preference for having a transition between hidden states coincide with a particular musical feature. In some implementations, musical features may be ordered based on duration or length, e.g. measured in seconds. In some implementations, hits may be ordered higher than beats. In some implementations, drops may be ordered higher than beats and hits. For example, the order may be, from highest to lowest: a part, a phrase, a drop, a hit, a bar, an onbeat, a beat, a quaver, and a semiquaver, or a subset thereof (such as a part, a beat, a quaver). As another example, the order may be, from highest to lowest: a part, a drop, a bar, an onbeat, a beat, a quaver, and a semiquaver. System 1000 may be configured to adjust an identified sequence of parts in a song such that transitions coincide, at least, with musical features having higher priority. For example, a first adjustment may be made such that a first particular transition coincides with a beat, and, subsequently, a second adjustment may be made such that a second particular transition coincides with a particular drop (or, alternatively, a hit). In case of conflicting adjustments, the higher priority musical features may be preferred.

In some implementations, heuristics may be used to dissuade parts from having a very short duration (e.g., less than a bar, less than a second, etc.). In other words, if a transition between parts follows a previous transition within a very short duration, one or both transitions may be adjusted in accordance with this heuristic. In some implementations, a transition having a short duration in combination with a constant level of amplitude for one or more frequency ranges (i.e. a lack of a percussive gap, or a lack of another type of gap) may be adjusted in accordance with a heuristic. In some implementations, heuristics may be used to adjust transitions based on the amplitude of a particular part in a particular frequency range. For example, this amplitude may be compared to other parts or all or most of the song. In some implementations, operations by characteristic identification component 1430 and/or musical feature component 1440 may be performed based on the amplitude in a particular frequency range. For example, individual parts may be classified as strong, average, or weak, based on this amplitude. In some implementations, heuristics may be specific to a type of music. For example, electronic dance music may be analyzed using different heuristics than classical music.

In some implementations, a number of beats may have been identified for a portion of a song. In some cases, more than one of the identified beats may be a bar, assuming at least that bars occur at beats, as is common. System 1000 may be configured to select a particular beat among a short sequence of beats as a bar, based on a comparison of the probabilities of each option, as determined using the HMM. In some cases, selecting a different beat as a bar may adjust the transitions between parts as well.

Object definition component 1450 may be configured to generate object definitions of display objects to represent one or more musical features identified by musical feature component 1440. A display object may include a visual representation of a musical feature with which it is associated, often as provided for display on a display device. By way of non-limiting example, a display object may include one or more of a digital tile, icon, thumbnail, silhouette, badge, symbol, etc. The object definitions of display objects may include the parameters and/or specifications of the visible features of the display objects that reflect, including in some implementations, the parameters and/or specifications denoting the place/position within a measure where the musical feature occurs. A visible feature may include one or more of shape, size, color, brightness, contrast, motion, and/or other features. For instance, the parameters and/or specifications defining visible features of display objects may include location, position, and/or orientation information.

By way of a non-limiting example, if a quaver is identified to occur at the same moment as a beat or an onbeat in the digital audio content, the quaver may be represented by a larger icon than a quaver that does not occur at the same time as a bar or onbeat. In another example, object definition component 1450 generates an object definition of a display object representing a musical feature based on the occurrence and/or attributes of one or more other musical features, e.g., a hit that is more intense (e.g., has a higher amplitude) than a previous hit in the digital audio content may be defined with a color having a brighter shade or deeper hue that is reflective of a difference in hit intensity. Definitions of display objects may be transmitted for display on a display device such that a user may consume them. In implementations where the definitions of display objects are transmitted for display on a display device, a user may ascertain differences in the between musical features, including between musical features of the same type or category, by assessing the differences in one or more visible features of the display objects provided for display.

It should be noted that the object definition component 1450, similar to all of the other components and/or elements of system 100, may operate dynamically. That is, it may re-generate and adjust object definitions for display objects iteratively (e.g., redetermining the location data for a particular display object based on the logical temporal position of the sample of audio content information it is associated with as compared to the logical temporal position of the sample of audio content information that is currently being played back). When the object definition component 1450 adjusts the definitions of the display objects on a regular or continuous basis, and transmits them to a display device accordingly, a user may be able to visually ascertain changes in musical pattern or identify significance of certain segments of the musical content, including in some implementations, being able to ascertain the foregoing as they relate to the audio content the user is simultaneously consuming.

It should also be noted that object definition component 1450 may be configured to define other features of the display objects that may or may not be independent of a musical feature. For example, the object definition component may also define each display object with a label (e.g., an alphanumeric label, an image label, and/or any other marking). For example, in some implementations, object definition component 1450 may be configured to define a label in connection with the object definition that represents the type of musical feature identified. The label may be textual name of the musical feature itself (e.g., "beat,"

"part," etc.), or an indication or variation of the textual name of the musical feature (e.g., "B" for beat, "SQ" for semi-quaver).

Content representation component 1460 may be configured to define a display arrangement of the one or more display objects (and/or other content) based on the object definitions, and transmit the object definitions to a display device. The content representation component 1460 may define and adjust the display arrangement of the one or more display objects (and/or other content) in any manner. For example, the content representation component 1460 may define an arrangement such that—if transmitted to a display device—the display objects may be displayed in accordance with temporal, spatial, or other logical location information associated therewith, and, in some implementations, relative to a moment being listened to or played during playback.

In some implementations, the arrangement of the display objects may be defined such that—if transmitted to a display device—would be arranged along straight vertical and horizontal lines in a GUI displaying a visual representation of the audio content (often a subsection of the audio content, e.g., a 10 second frame of the audio content). In such an arrangement, display objects denoting musical features of the same type may be aligned horizontally in a display window in accordance with the timing of their occurrence in the audio content. Display objects that occur at/near the same time in the audio content may be aligned vertically in accordance with the timing of their occurrence. That is, the musical features may be aligned in rows and columns, columns corresponding to timing and rows corresponding to musical feature types. In some implementations, the content representation component 1460 may be configured to display a visible vertical line marking the moment in the audio content playback that is actually being played back at a given moment. The vertical line marker may be displayed in front of or behind other display objects. The display objects that align with the horizontal positioning of vertical line marker may represent those musical features that correspond to the demarcated moment in the playback of the audio content. The display objects to the left of the vertical line marker may represent those musical features that occur/occurred prior to the moment aligning with the vertical line marker, and those to the right of the vertical line marker may represent those that will/may occur in a subsequent moment in the playback. Thus, a user may be able to simultaneously view multiple display objects that represent musical features occurring within a certain timeframe in connection with audio content playback (or optional playback).

Content representation component 1460 may be configured to scale the display arrangement and/or object definitions of the display objects such that the window frame that may be viewed is larger or smaller, or captures a smaller or larger segment/window of time in the visual representation (e.g., in a display field of a GUI). For example, in some implementations, the window frame may capture an "x" second segment of a "y" minute song, where x<y. In other instances, the window frame depicted captures the entire length of the song. In other implementations, the window frame is adjustable. For example, in some implementations content representation component 1460 may be configured to receive input from a user, wherein a user may define the timeframe captured by the window in the visual representation. Content representation component 1460 may be configured to scale the object definitions of the display objects, as is commonly known in the art, such that the display objects may be accommodated by displays of different size/dimension (e.g., smartphone display, tablet display, television display, desktop computer display, etc.). Content representation component 1460 may be configured to transmit one or more object definitions (and/or other content) for display on a display device, as illustrated by way of example in FIG. 2.

Figure 2:
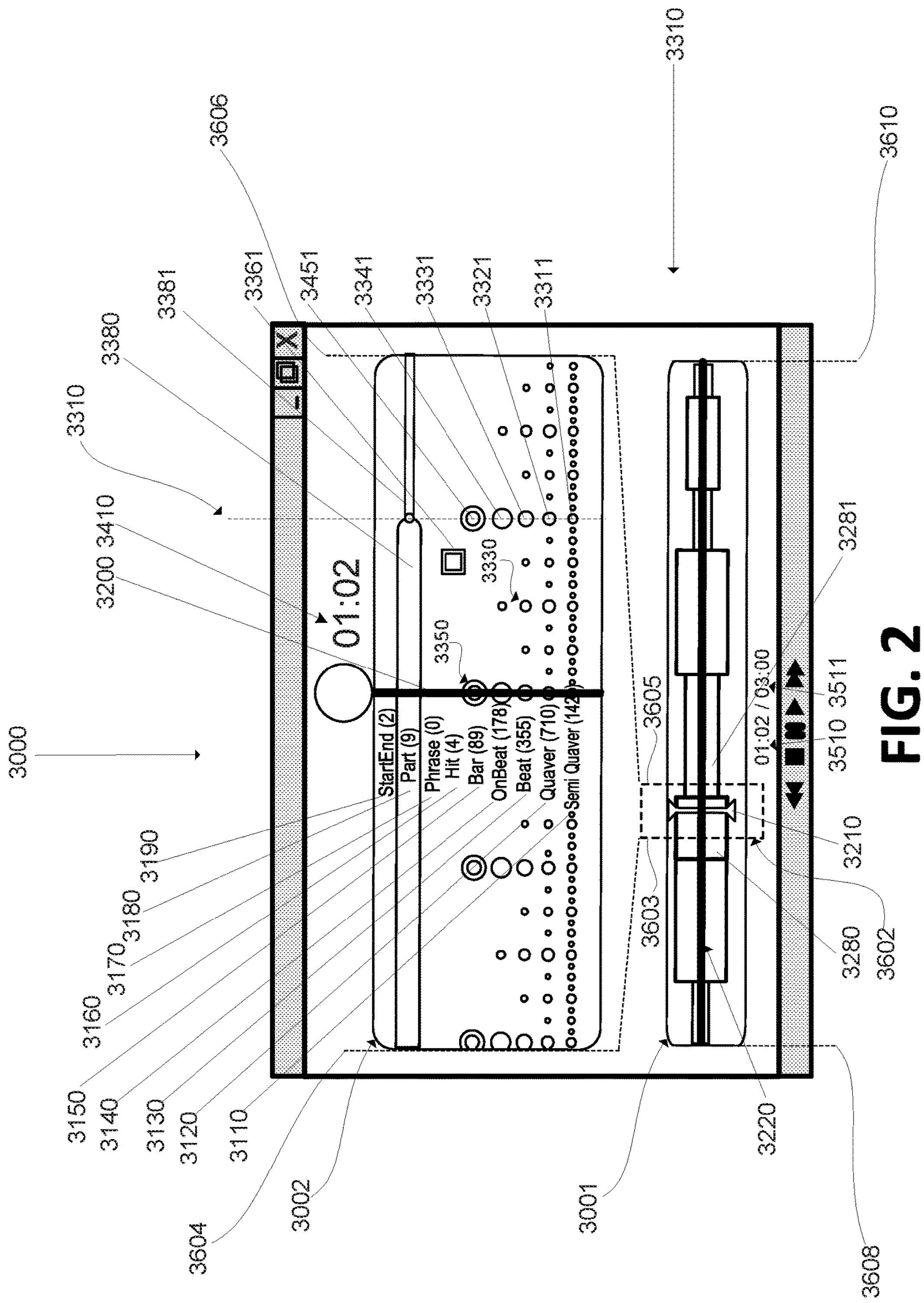
FIG. 2 illustrates an exemplary graphical user interface for symbolically portraying an exemplary visual representation of musical features identified in connection with audio content in accordance with one or more implementations of the present disclosure.

FIG. 2 illustrates an exemplary display arrangement 3000 (e.g., a graphical user interface), which may be provided, generated, defined, or transmitted—in whole or in part—by content representation component 1460 in accordance with some implementations of the present disclosure. Content representation component 1460 may transmit display arrangement information for display on a display device with which an exemplary implementation of system 1000 may be operatively coupled. As shown, display arrangement 3000 may include one or more dynamic display panes, e.g., 3001, 3002, dedicated to displaying visual representation(s) of audio content information and/or musical features in connection with the audio content information. Pane 3001 may display a horizontal timeline marker 3220 demarking time length measurement of the audio content information, e.g., with different positions along the horizontal timeline marker 3220 corresponding to different times/samples of the audio content information. The total time represented by the horizontal timeline marker 3220 may be indicated by total playback time indicator 3511 (e.g., a total time of three minutes for the particular audio content information loaded). The left end of the horizontal timeline marker 3220 (running to edge of pane 3001 denoted by reference numeral 3608) may correspond to the logical temporal beginning of the audio content information (e.g., time=00:00 in the depicted example), and the right end of the horizontal timeline marker 3220 (running to edge of pane 3001 denoted by reference numeral 3610) may correspond to the logical temporal end of the audio content information (e.g., time=03:00 in the depicted example). Pane 3002 may include more detailed information about a particular time segment of the audio content information. For example, the information displayed between the edges of pane 3002 (left edge denoted by 3604, right edge denoted by 3606) may correspond to the time segment of the audio content information associated within the time frame represented by box 3602 (which may or may not be visible and/or adjustable by a user). As depicted, the time boundaries denoted by left edge 3603 and right edge 3605 of box 3602 correspond to edges 3604 and 3602 of pane 3002 respectively. In other words, pane 3002 may illustrate an exploded view that drills down into the time segment bounded by box 3602 to show more detailed musical feature information about that segment. In some implementations, box 3602 is not visible to a user, and in other implementations it is visible to a user in some manner. In some implementations, content representation component 1460 may be configured to receive input from a user to adjust the boundaries (3603 and 3605) of box 3602, thereby adjusting the time segment that is drilled down into for more detail and displayed in pane 3002.

In some implementations, content representation component 1460 may be configured to provide more or less musical feature information about audio content based on the length of playback time captured by the boundaries (3603 and 3605) of box 3602. For example, in some implementations, boundaries 3603 and 3605 may be defined (by a user or as a predefined parameter) such that they correspond to the beginning 3608 and end 3610 of the audio content (if played back). In some implementations, boundaries 3603 and 3605 may be defined (by a user or as a predefined parameter) such that they correspond to a very small portion of the audio content playback (e.g., capturing a 2 second portion, 5 second portion, 4.3 second portion, 1.01 minute portion, etc.). Because system 1000 may identify musical features associated with each sample, content representation component 1460 may limit the amount of information that is actually displayed in pane 3002 based, in whole or in part, on the portion of the audio content information captured in the predefined timeframe. For example, more musical features may be shown per unit of time where the timeframe captured in pane 3002 is small (e.g., 1.0 second), and fewer musical features may be shown per unit of time where the timeframe captured in pane 3002 is large (e.g., 2.0 minutes). In some implementations, the time-segment box 3602 may be defined/adjusted in accordance with one or more predefined rules, e.g., to capture four measures of the song within the window, regardless of the time length of the song, or the length of time selected by a user. As depicted, the time-segment box 3602 may track a playback indicator 3210 during playback of the audio. The time-segment box 3602 may be keyed to movements of the playback indicator as it progresses along the length of horizontal timeline marker 3220 during playback. Playback time indicator 3510 may indicate the relative temporal position of playback indicator 3210 along horizontal timeline marker 3220.

In some implementations, content representation component 1460 may be configured to have media player functionality (e.g., play, pause, stop, start, fast-forward, rewind, playback speed adjustment, etc.) dynamically operable with any of the other features described herein. For example, system 1000 may load in a music file for display in display arrangement 3000, the user may select to the play button to listen to the music (through speakers operatively coupled therewith), and any and all of the display arrangement, display objects, and any other display items may be dynamically keyed thereto (e.g., keyed to the playback of the audio content information). For instance, as the music is playing, playback indicator 3602 may move from left to right along the horizontal timeline marker 3220, time-segment box 3602 may be keyed to and move along with the playback indicator 3602, the display objects in pane 3002 may be dynamically repositioned such that they move from right to left (or in any other preferred direction/orientation) as the song plays, etc.

As shown, different display objects 3310-3381 provided for display in display arrangement 3000 may represent different musical features that have been identified by musical feature component 1440 in connection with one or more portions (e.g., time samples) of audio content information (e.g., during playback, during a visually preview, as part of a logical association or representation, etc.). For example, circle 3311 may represent a semi-quaver feature identified in connection with the playback time designated by the representative vertical line 3310 in FIG. 2. Circle 3321 may represent a quaver feature identified in connection with the playback time designated by the representative vertical line 3310 in FIG. 2. Circle 3331 may represent a onbeat feature identified in connection with the playback time designated by the representative vertical line 3310 in FIG. 2. Hollow circle 3341 may represent a bar in the audio content identified in connection with the playback time designated by the representative vertical line 3310 in FIG. 2. Hollow square 3361 may represent a hit feature identified in connection with a playback time prior to the playback time designated by the representative vertical line 3310 in FIG. 2. The display objects for 'part' features may be represented by horizontally elongated blocks spanning the range of time for which the 'part' lasts, e.g., block 3380 and block 3381 depicting different 'parts,' the transition between parts aligning with vertical line 3310, etc. The 'parts' throughout the entire audio content may be similarly represented as an underlay, overlay, shadow, or watermark displayed in association with the time-line 3220 (shown as an underlay in FIG. 2). For example, block 3280 represents a part that corresponds to the same part represented by block 3380, and block 3281 represents a part that corresponds to the same part represented by block 3381. Additionally, playback-time identifier 3210 may correspond to playback-time identifier 3200. Playback time identifier 3210 may be displayed to move side to side (e.g., left to right during playback) within pane 3001, while playback time identifier 3200 may be displayed in a locked position, with all of the other display objects moving from side to side (e.g., right to left during playback) relative thereto.

The horizontal displacement between different display objects may corresponds to the relative time displacement between the instances and/or sample(s) where the identified musical feature(s) occur. For example, there may be four seconds (or other time unit) between bar feature 3350 and bar feature 3451, but only two seconds between beat feature 3330 and beat feature 3331 (where beat feature 3331 and bar feature 3451 occur at approximately the same time); thus, in this example, the horizontal displacement between beat feature 3330 and beat feature 3331 may be approximately half as large as the displacement between bar feature 3350 and bar feature 3451.

Also as shown in FIG. 2, musical features of the same type that occur at different times may be represented by display objects of different sizes. Differences in size have been shown in FIG. 2 to demonstrate a visual feature that may be used to indicate differences in intensity or significance for each identified musical feature. It will be appreciated by one of ordinary skill in the art that any visual feature(s) may be employed to denote any one or more differences among musical features of the same type, or musical features different types. Examples of other such features may include one or more of size, shape, color, brightness, contrast, motion, location, position, orientation, and/or other features.

In some implementations, the display arrangement may include one or more labels 3110-3190 denote the particular arrangement of musical features in pane 3002. For example, label 3110 uses the text "Semi Quaver" floating in a position along a horizontal line where each display object associated with an identified semi quaver in the audio content. As depicted, label 3120 uses the text "Quaver" floating in a position along a horizontal line where each display object associated with an identified quaver in the audio content; label 3130 uses the text "Beat" floating in a position along a horizontal line where each display object associated with an identified beat in the audio content; label 3140 uses the text "OnBeat" floating in a position along a horizontal line where each display object associated with an identified onbeat in the audio content; label 3150 uses the text "Bar" floating in a position along a horizontal line where each display object associated with an identified bar in the audio content; label 3160 uses the text "Hit" floating in a position along a horizontal line where each display object associated with an identified hit in the audio content; label 3170 uses the text "Phrase" floating in a position along a horizontal line where each display object associated with an identified phrase in the audio content; label 3180 uses the text "Part" floating in a position along a horizontal line where each display object associated with an identified part in the audio content; and label 3190 uses the text "StartEnd" floating in a position along a horizontal line where each display object associated with an identified beginning or ending of the audio content occurs. As shown, many other objects may be provided for display (e.g., playback time of the audio content, 3410, etc.)

Figure 3:
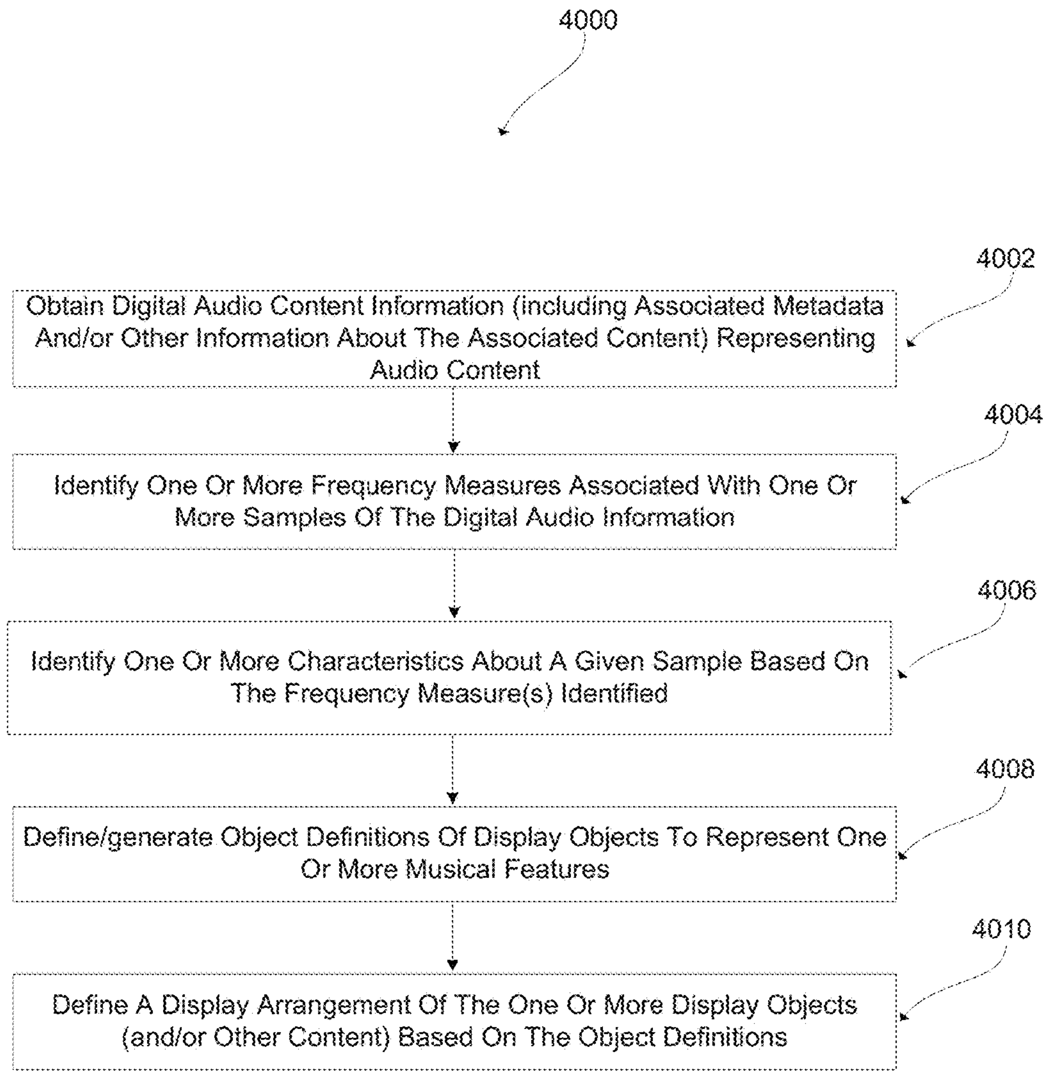
FIG. 3 illustrates an exemplary method for detecting, and in some implementations, displaying, musical features associated with audio content in accordance with one or more implementations of the present disclosure.

FIG. 3 illustrates a method 4000 that may be implemented by system 1000 in operation. At operation 4002, method 4000 may obtain digital audio content information (including associated metadata and/or other information about the associated content) representing audio content. At operation 4004, method 4000 may identify one or more frequency measures associated with one or more samples (i.e. discrete moments) of the digital audio content information. At operation 4006, method 4000 may identify one or more characteristics about a given sample based on the frequency measure(s) identified for that particular sample and/or based on the frequency measure(s) identified for any other one or more samples in comparison to the given sample, and/or based upon recognized patterns in frequency measure(s) across multiple samples. At operation 4008, method 4000 may define/generate object definitions of display objects to represent one or more musical features. At operation 4010, method 4000 may define a display arrangement of the one or more display objects (and/or other content) based on the object definitions. In some implementations, although not depicted, method 4000 is further configured to perform the step of transmitting the object definitions to a display device (e.g., a monitor).

Referring back now to FIG. 1, it should be noted that client computing platform(s) 1100, server(s) 1600, online sources 1700, and/or external resources 1800 may be operatively linked via one or more electronic communication links 1500. For example, such electronic communication links may be established, at least in part, via a network such as the Internet and/or other networks. It will be appreciated that this is not intended to be limiting and that the scope of this disclosure includes implementations in which client computing platform(s) 1100, server(s) 1600, online sources 1700, and/or external resources 1800 may be operatively linked via some other communication media.

In some implementations, client computing platform(s) 1100 may be configured to provide remote hosting of the features and/or function of machine-readable instructions 1400 to one or more server(s) 1600 that may be remotely located from client computing platform(s) 1100. However, in some implementations, one or more features and/or functions of client computing platform(s) 1100 may be attributed as local features and/or functions of one or more server(s) 1600. For example, individual ones of server(s) 1600 may include machine-readable instructions (not shown in FIG. 1) comprising the same or similar components as machine-readable instructions 1400 of client computing platform(s) 1100. Server(s) 1600 may be configured to locally execute the one or more components that may be the same or similar to the machine-readable instructions 1400. One or more features and/or functions of machine-readable instructions 1400 of client computing platform(s) 1100 may be provided, at least in part, as an application program that may be executed at a given server 1100.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

We claim:

1. A system for identifying musical features in digital audio content, comprising:

one or more physical computer processors configured by computer readable instructions to:

obtain a digital audio file, the digital audio file including information representing audio content, the information providing a duration for playback of the audio content and a representation of sound frequencies associated with one or more moments in the audio content;

identify one or more sound frequencies associated with a first moment in the duration of the audio content;

identify one or more sound frequencies associated with a second moment in the duration of the audio content;

identify one or more frequency characteristics associated with the first moment based on at least one of the one or more sound frequencies associated with the first moment and at least one of the one or more sound frequencies associated with the second moment;

identify one or more musical features associated with the first moment based on the one or more identified frequency characteristics, wherein the one or more musical features include one or more of a phrase, a drop, a hit, a bar, an onbeat, a beat, a quaver, and/or a semiquaver;

identify a transition in the audio content from a first part to a second part, the transition identified at a third moment in the duration of the audio content; and adjust the identification of the transition from the third moment to a fourth moment in the duration of the audio content based on at least one of the one or more identified musical features.

2. The system of claim 1, wherein the one or more of the frequency characteristics include amplitude associated with the first moment.

3. The system of claim 1, wherein the identification of the transition is based on using a Hidden Markov Model.

4. The system of claim 1, wherein the identification of the one or more musical features is based on a match between one or more of the identified frequency characteristics and a predetermined frequency pattern template corresponding to a particular musical feature.

5. The system of claim 1, wherein the identification of the transition is adjusted to the fourth moment to occur between two of the one or more identified musical features.

6. The system of claim 1, wherein the identification of the transition is adjusted further based on a first duration of the first part and/or a second duration of the second part being shorter than a threshold duration.

7. The system of claim 1, wherein the identification of the transition is adjusted to the fourth moment to coincide with one of the one or more identified musical features.

8. The system of claim 7, wherein the one of the one or more identified musical features is selected for the adjustment of the identification of the transition based on a hierarchy of musical features, the hierarchy of musical features including an order of different types of musical features from a highest priority to a lowest priority.

9. The system of claim 8, wherein the one of the one or more identified musical features has the highest priority among the one or more identified musical features.

10. The system of claim 8, wherein the order includes, from the highest priority to the lowest priority, a phrase musical feature, a drop musical feature, a hit musical feature, a bar musical feature, an onbeat musical feature, a beat musical feature, a quaver musical feature, and a semiquaver musical feature.

11. A method for identifying musical features in digital audio content, the method comprising the steps of:

obtaining a digital audio file, the digital audio file including information representing audio content, the information providing a duration for playback of the audio content and a representation of sound frequencies associated with one or more moments in the audio content;

identifying one or more sound frequencies associated with a first moment in the duration of the audio content;

identifying one or more sound frequencies associated with a second moment in the duration of the audio content;

identifying one or more frequency characteristics associated with the first moment based on at least one of the one or more sound frequencies associated with the first moment and at least one of the one or more sound frequencies associated with the second moment;

identifying one or more musical features associated with the first moment based on the one or more identified frequency characteristics, wherein the one or more musical features include one or more of a phrase, a drop, a hit, a bar, an onbeat, a beat, a quaver, and/or a semiquaver;

identifying a transition in the audio content from a first part to a second part, the transition identified at a third moment in the duration of the audio content; and adjusting the identification of the transition from the third moment to a fourth moment in the duration of the audio content based on at least one of the one or more identified musical features.

12. The method of claim 11, wherein the one or more of the frequency characteristics include amplitude associated with the first moment.

13. The method of claim 11, wherein identifying the transition is based on using a Hidden Markov Model.

14. The method of claim 11, wherein the identification of the one or more musical features is based on a match between one or more of the identified frequency characteristics and a predetermined frequency pattern template corresponding to a particular musical feature.

15. The method of claim 11, wherein the identification of the transition is adjusted to the fourth moment to occur between two of the one or more identified musical features.

16. The method of claim 11, wherein the identification of the transition is adjusted further based on a first duration of the first part and/or a second duration of the second part being shorter than a threshold duration.

17. The method of claim 11, wherein the identification of the transition is adjusted to the fourth moment to coincide with one of the one or more identified musical features.

18. The method of claim 17, wherein the one of the one or more identified musical features is selected for the adjustment of the identification of the transition based on a hierarchy of musical features, the hierarchy of musical features including an order of different types of musical features from a highest priority to a lowest priority.

19. The method of claim 18, wherein the one of the one or more identified musical features has the highest priority among the one or more identified musical features.

20. The method of claim 18, wherein the order includes, from the highest priority to the lowest priority, a phrase musical feature, a drop musical feature, a hit musical feature, a bar musical feature, an onbeat musical feature, a beat musical feature, a quaver musical feature, and a semiquaver musical feature.

* * * * *